(12) United States Patent
Galindo-Legaria et al.

(10) Patent No.: US 7,509,311 B2
(45) Date of Patent: Mar. 24, 2009

(54) USE OF STATISTICS ON VIEWS IN QUERY OPTIMIZATION

(75) Inventors: Cesar A. Galindo-Legaria, Redmond, WA (US); Milind M. Joshi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 454 days.

(21) Appl. No.: 10/652,423

(22) Filed: Aug. 29, 2003

(65) Prior Publication Data

US 2005/0050041 A1 Mar. 3, 2005

(51) Int. Cl.
G06F 17/30 (2006.01)
(52) U.S. Cl. .............................. 707/4; 707/3
(58) Field of Classification Search .......... 707/1–10, 707/100–104.1, 200–205
See application file for complete search history.

(56) References Cited

U.S. PATENT DOCUMENTS

| | | | | |
|---|---|---|---|---|
| 6,223,171 | B1 * | 4/2001 | Chaudhuri et al. | 707/2 |
| 6,338,056 | B1 * | 1/2002 | Dessloch et al. | 707/2 |
| 6,360,214 | B1 * | 3/2002 | Ellis et al. | 707/2 |
| 6,763,359 | B2 * | 7/2004 | Lohman et al. | 707/102 |
| 6,801,905 | B2 * | 10/2004 | Andrei | 707/2 |
| 6,847,978 | B2 * | 1/2005 | Ellis et al. | 707/102 |
| 6,947,927 | B2 * | 9/2005 | Chaudhuri et al. | 707/3 |
| 6,996,556 | B2 * | 2/2006 | Boger et al. | 707/3 |
| 2005/0097078 | A1 * | 5/2005 | Lohman et al. | 707/2 |

OTHER PUBLICATIONS

Surajit Chaudhari and Nicholas Bruno; Exploiting Statistics on Query Expressions for Optimization; Jun. 4-6, 2002; ACM; pp. 263-274.*
George Lumpkin, Hakan Jakobsson;Query Optimization in Oracle9i;Feb. 2002;Oracle Corporation; pp. 1-30.*
Bruno, N. et al., "Exploiting Statistics on Intermediate Tables for Query Optimization", *Proc. of the ACM SIGMOD Int'l Conf. on Management of Data*, Jun. 2002.
Galindo-Legaria, C. et al., "Statistics on Views", *Proceedings of the 29$^{th}$ VLDB Conference*, Sep. 9, 2003, 11 pages.
Goldstein, J. et al., "Optimizing Queries Using Materialized Views: A Practical, Scalable Solution", *Proc. of the ACM SIGMOD Int'l Conference on Management of Data*, Jun. 2001, 1-12.
Graefe, G., "The Cascades Framework for Query Optimization", *IEEE Data Engineering Bulletin*, 1995, 18(3), 19-29.
Graefe, G. et al., "The Volcano Optimizer Generator: Extensibility and Efficient Search", *Proc. of the IEEE International Conference on Data Engineering*, 1993, 209-218.

* cited by examiner

*Primary Examiner*—Hosain T Alam
*Assistant Examiner*—Navneet K Ahluwalia
(74) *Attorney, Agent, or Firm*—Woodcock Washburn LLP

(57) ABSTRACT

A query optimizer produces a preferred execution plan by utilizing statistics on views. These provide the optimizer with statistical information beyond that available on tables, for example, with information on the result of scalar or relational expressions. Pre-derived accurate statistics are thus available which are used to improve the accuracy of estimation and thus increase the quality and reliability of the query processor. Transformations of expressions and sub-expressions of candidate plans produce equivalent sub-expressions. Where those sub-expressions include references to views, an estimation of the cardinality and other execution statistics for the sub-expression can be made using the view statistics. This can be used to estimate the cardinality for all equivalent sub-expressions, leading to higher accuracy for the estimate.

24 Claims, 5 Drawing Sheets

USE OF STATISTICS ON VIEWS IN QUERY OPTIMIZATION

FIELD OF THE INVENTION

The present invention relates generally to the field of database systems. More particularly, the invention relates to query optimization and, more specifically, to estimating cardinality based on statistics on views.

BACKGROUND OF THE INVENTION

Relational database systems are important tools for storing, retrieving, and processing information. In order to retrieve information from a database, a user provides a query written in a query language such as Structured Query Language (SQL). The query specifies the information to be retrieved and, in some cases, the manner in which it is to be manipulated or evaluated in order to provide the desired result. Queries may contain requests to derive information by performing set operations on the tables, such as join, sort, merge, and so on. To process the query, the database system may convert the query into a relational expression that describes algebraically the result specified by the query. The relational expression is then used to produce an execution plan, which describes particular steps to be taken by a computer in order to produce the sought result.

Query optimizers are used to improve database performance. The role of a query optimizer is to take a query, as specified by the user in a high level language, and generate an efficient execution plan for such query. To select an execution plan, the query optimizer picks the plan with the least anticipated execution cost from possible candidate plans. Unlike other common programming languages, database query languages are declarative rather than procedural. Thus, query optimizers can consider a very large number of execution alternatives, based on the size of tables used, the data distributions, and existing indices or other access paths.

Selection of one specific execution plan to be used over other possible execution plans is based on the estimated execution cost of execution plans. Such estimation is based on the estimated number of rows that will be flowed in each step of the execution plan. Estimating the number of rows flowed in each step of an execution plan is commonly known as the "cardinality estimation problem."

In conventional query optimization methods, cardinality estimation is performed by starting with statistics collected on base tables. Such statistics are typically gathered by executing special purpose queries or processes, which read all or part of a database table, perform some analysis, and store the results for later use by the query optimizer. Statistics gathering may be triggered automatically based on the columns used to execute a query.

For conventional query optimization, the size of the table and one or more histogram containing statistics about the values in the table may be used. For example, a table may have 600,000 rows. Each row may have a value for a specific variable. A histogram may show the number of rows which have a certain value for the variable. For a continuous variable, the histogram may divide the range for the continuous variable into subranges, and show the number of rows with a value for the variable in each subrange. Thus, when a query requests the rows with a value for the continuous variable above a specified number (in order to perform, for example, a join of those with another set of rows) it can be estimated how many data rows will be flowed (in the example, to the join.)

Thus, the statistics collected on base tables are used to estimate the number of data rows that will qualify different data manipulation operators such as filter conditions, joins, and aggregations.

However, with this approach arbitrary large estimation errors can be introduced while deriving the number of qualifying rows through different operators. Errors grow as estimation is done on top of estimation, so that after several filters and joins, the estimated cardinality may be very far from the actual value. In addition, there are constructs that simply cannot be estimated based on statistics of base table columns. The standard approach when such constructs are encountered is to use a "guess" or "magic number," such as a ⅓ data reduction factor for inequality comparisons and 1/10 data reduction factor for equality.

This in turn introduces estimation errors in the estimated cost of plans, which leads to selecting execution plans with very poor performance. The quality of plans generated by the optimizer is tied to the accuracy of its cost estimation. Incorrect estimation may lead the optimizer to regard some plans as efficient, when in reality they are very expensive to execute. As effective optimization and good physical design can introduce dramatic performance improvements, so selecting the wrong execution plan can lead to dramatic slowdowns.

Estimation errors may occur in several different situations. For example, where there is a predicate involving operations on multiple columns of the same table or scalar operations on one column (or multiple columns) of a table, an estimation error may occur. An example of the use of two columns from the same table can be seen in the following query, where "LINEITEM" is the table and L_EXTENDEDPRICE and L_DISCOUNT are two columns from that table:

SELECT * FROM LINEITEM
WHERE
  L_EXTENDEDPRICE>L_DISCOUNT

In this example, the cases (rows) from LINEITEM where the L_EXTENDEDPRICE column value is greater than the L_DISCOUNT column value are requested. For each row, this performs a comparison of the values in two different columns for the same row. Because a histogram describes the population of a column only collectively, there is no way to take two histograms describing the two columns (L_EXTENDEDPRICE and L_DISCOUNT) and determine what the number of rows might be for which L_EXTENDEDPRICE>L_DISCOUNT.

As another example, scalar operation on multiple columns from the same table may be seen in the following query, where, again, "LINEITEM" is the table and L_EXTENDEDPRICE and L_DISCOUNT are two columns from that table.

SELECT * FROM LINEITEM
WHERE
  L_EXTENDEDPRICE *(1-L_DISCOUNT)>900000

In this example, the cases (rows) from LINEITEM where the L_EXTENDEDPRICE column value times one minus the L_DISCOUNT column value is less than 900,000 are requested. Although a histogram may exist for each of L_EXTENDEDPRICE and L_DISCOUNT, these histograms may not include enough information to determine the number of rows which may result from the query. Using very detailed information to try to estimating the distribution of the product of the two column values in the query is costly, and using less detailed information can easily introduce large errors.

Additionally, scalar operations may be used in a query. Because of the limited information on which estimates are being based, such scalar operations may lead to problems in forming estimations. For example, arithmetic modulo (%), conditional evaluation (CASE-WHEN-ELSE-END), and string operations such as concatenation and substring evaluation may not lend themselves to estimation with the data contained in histograms.

Additionally, errors may be introduced when the independence assumption is violated. As an example, the following query selects cases based on two column values, where CUSTOMER and NATION are tables and a "C_" prefix denotes a column in the CUSTOMER table and an "N_" prefix denotes a column in the NATION table:

SELECT * FROM CUSTOMER, NATION
WHERE C_NATIONKEY=N_NATIONKEY
AND N_NAME='BRAZIL'

In this example, rows in the CUSTOMER table are selected for which the C_NATIONKEY corresponds to a N_NAME of "BRAZIL". If an assumption is made that the C_NATIONKEY value for the rows in the CUSTOMER table are approximately evenly distributed among the possible values for C_NATIONKEY, it can be assumed that approximately 1/(possible values for C_NATIONKEY) rows will be selected. However, this assumption, that the distribution is independent of any other factors, may be incorrect.

This can also be seen to be a problem in the previous example query. One way to derive an estimate is to assume that the distribution of L_EXTENDEDPRICE values, as shown in the histogram corresponding to that column, is independent of the distribution of L_DISCOUNT values. However, this may not be a correct assumption, and may lead to an estimation error.

Additionally, where aggregate results are estimated for groups of rows (for example, grouped by a group key) estimation errors may be introduced.

Again, while these estimation errors may be small, the cumulative effect of such estimation errors when a number of estimates are used to determine the cost for an execution plan may be large.

Where advanced operations, such as transitive closure, Pivot/Unpivot, and statistical extensions (such as the proposed SQL Statistical Extensions), are performed, these advanced operations can not be estimated using prior art techniques for estimating the cardinality of such complex queries from the standard table column statistics. User-defined functions and aggregates can also not be estimated, in some cases, using prior art techniques for estimation.

Thus, there is a need in the art for systems and methods for cardinality estimation with improved performance over these in which statistics regarding tables are used. It is desired that such systems and methods improve the accuracy of cardinality estimation.

SUMMARY OF THE INVENTION

Execution plan optimization is enhanced by using stored view statistics to estimate the cardinality of various steps in candidate plans. Where the candidate plans do not expressly reference views, equivalent expressions or sub-expressions to all or part of the candidate plans are found using transformation rules, and statistics on these equivalents are calculated using view statistics. Since these are equivalents, the statistics on the equivalents can be used to determine or estimate execution statistics for the original parts of the candidate plans. In this way, view statistics can allow better performance by an optimizer.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

A database system is one of the most commonly-used software tools. Database systems typically perform operations on information in the form of tables or "relations." A query may require several operations, and there may be several possible plans by which a query may be executed. A query optimizer produces a preferred execution plan by utilizing statistics on views. These provide the optimizer with statistical information beyond that available on tables, for example, with information on the result of scalar or relational expressions. Pre-derived accurate statistics are thus available which are used to improve the accuracy of estimation and thus increase the quality and reliability of the query processor.

Exemplary Computing Environment

Figure 1:
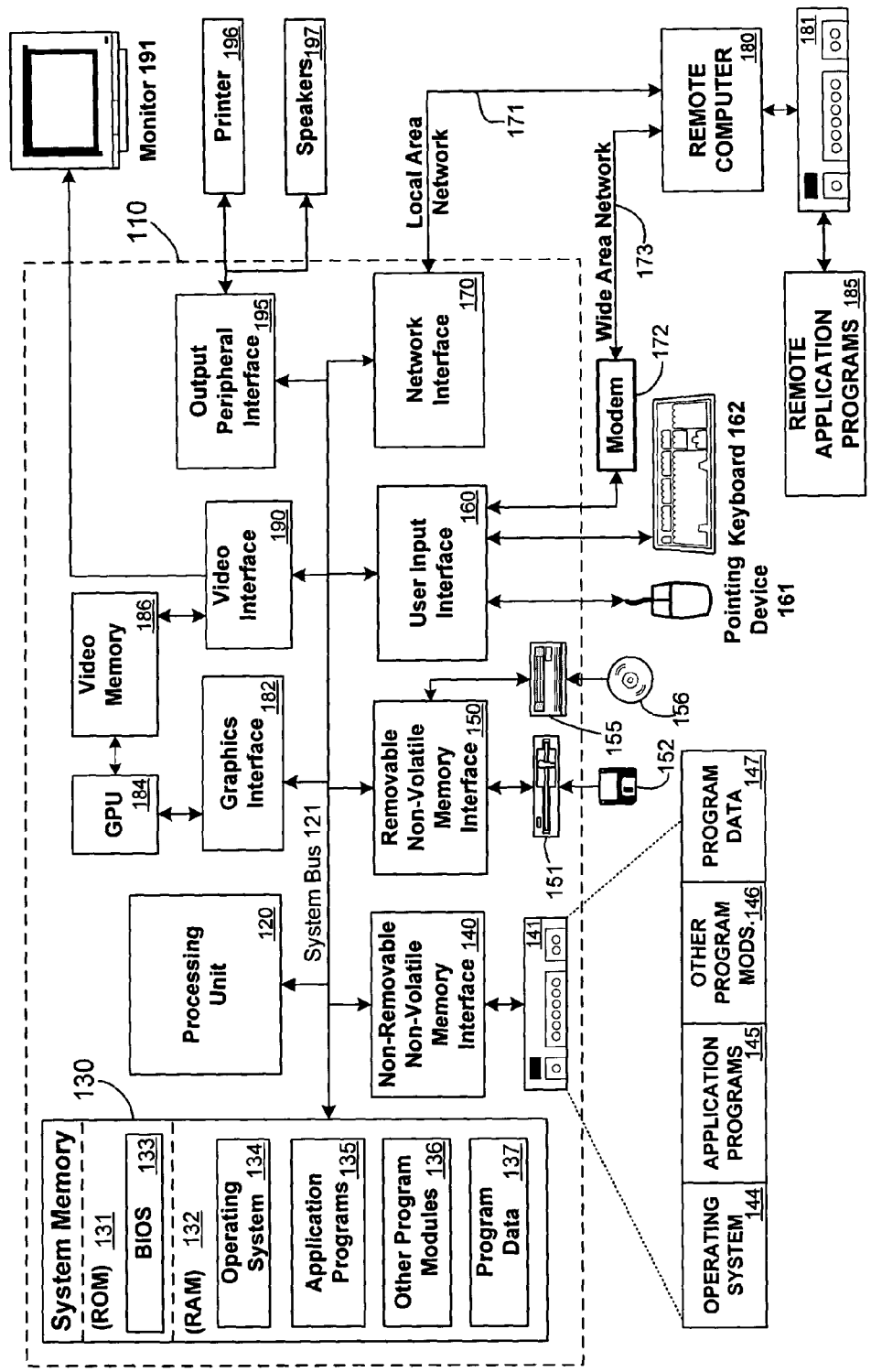
FIG. 1 is a block diagram representing a general purpose computer system in which aspects of the present invention and/or portions thereof may be incorporated.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Cardinality-Equivalent Queries Incorporating Views

In database systems, the capability of creating views is often provided. A view can be thought of as a virtual table or as a stored query. The "contents" of the virtual table are defined by a query. Like a real (non-view) table, a view consists of a set of named columns and rows of data. However, a view does not exist as a stored set of data values in a database as a table would be. Instead, the rows and columns of data which make up the view come from the tables referenced in the query defining the view, and are produced dynamically when the view is referenced. New columns of data may be included which store the result of operations on other columns—for example, a product of two columns. The data in views may reference other views. A view is created by defining a select statement that retrieves the data to be presented by the view.

In the previous example, all rows in a CUSTOMER table with C_NATIONKEY column values equal to the N_NATIONKEY column value corresponding to the N_NAME of 'BRAZIL' in a NATION table are sought. As described above, this query may be stated as follows:

SELECT * FROM CUSTOMER, NATION
WHERE C_NATIONKEY=N_NATIONKEY
AND N_NAME='BRAZIL'

Figure 2:
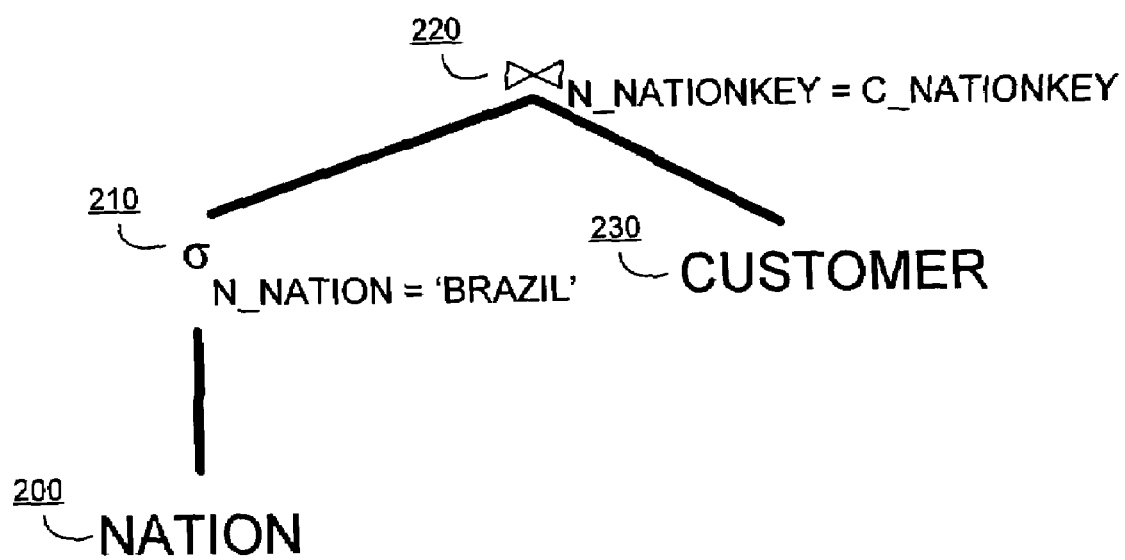
FIG. 2 is a block diagram of an operator tree for an exemplary expression.

The query is represented by the operator tree shown in FIG. 2. The NATION table 200 is selected from to find those rows where N_NATION='BRAZIL'—this selection is represented by selection sigma 210. A join 220 is then performed on that selection with the CUSTOMER table 230, finding those rows for which the value of N_NATIONKEY from the selected rows from NATION is equal to the C_NATIONKEY from the CUSTOMER table. The conventional cardinality estimation approach would estimate both predicate N_NATION='BRAZIL' from the NATION table 200 and predicate C_NATIONKEY=N_NATIONKEY. Because an assumption of statistical independence would be made, the result from this combination may include a significant error.

However, a view "CUSTNATION" may be created which is a virtual table which includes all columns from the CUSTOMER and NATION tables, and rows are filled by row information from CUSTOMER and NATION tables for which the C_NATIONKEY value equals the N_NATIONKEY value. For example, the view may be created with the following statement:

CREATE VIEW CUSTNATION AS
SELECT * FROM CUSTOMER, NATION
WHERE C_NATIONKEY=N_NATIONKEY

Figure 3:
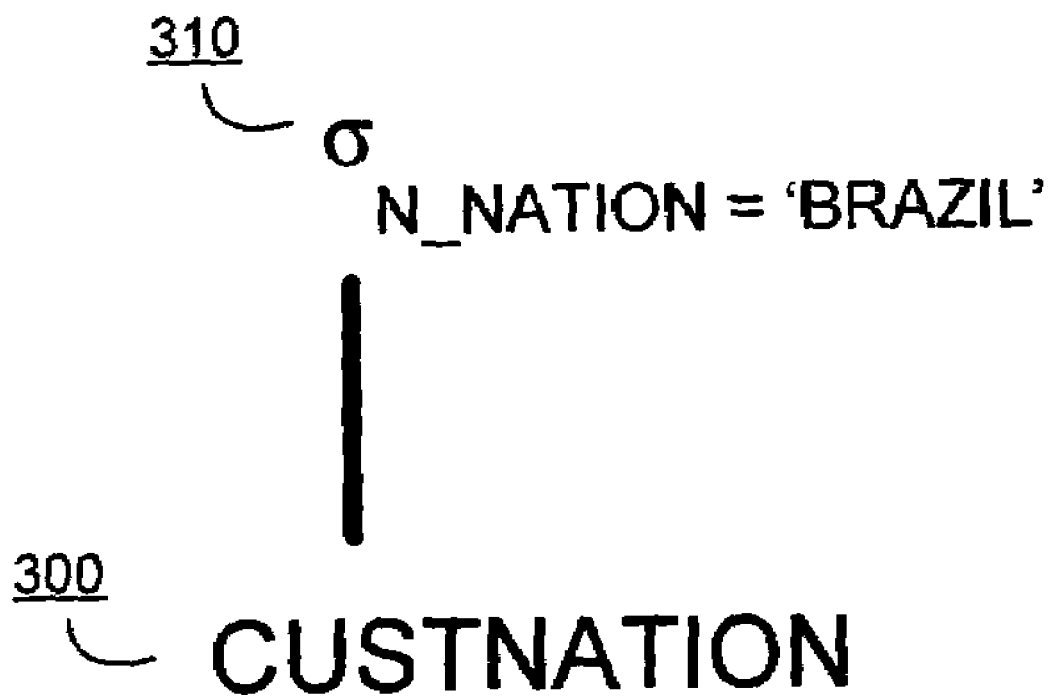
FIG. 3 is a block diagram of an operator tree for an exemplary equivalent expression.

With this view, the information resulting from the query above can be obtained by querying the view CUSTNATION for those rows in which the value in the N_NATION column is equal to 'BRAZIL'. This query is shown by the operator tree shown in FIG. 3. A selection 310 is performed on the CUSTNATION view 300 to find those rows for which the N_NATION value is 'BRAZIL.'

Given the equivalence of these expressions, if the view CUSTNATION were materialized, the optimizer could use either of the two forms for execution, and would pick the one with the least anticipated cost. However, even if the view CUSTNATION were not materialized, because there is a one-to-one correspondence between the rows in the result of the non-view query represented by the operator tree in FIG. 2 and the rows in the result of the query using a view shown by the operator tree in FIG. 3, these queries are of identical cardinality. The optimizer can therefore use statistics about such views to estimate the size of the result by estimating the size of the cardinality-equivalent query using views (such as one represented in FIG. 3).

Even where the view is not materialized, statistics about the view may be used for cardinality-estimation. Picking an alternative equivalent query to estimate the size and other statistics of the result is independent of the plan selected for execution.

Use of Statistics on Views for Cardinality Estimation

Figure 4:
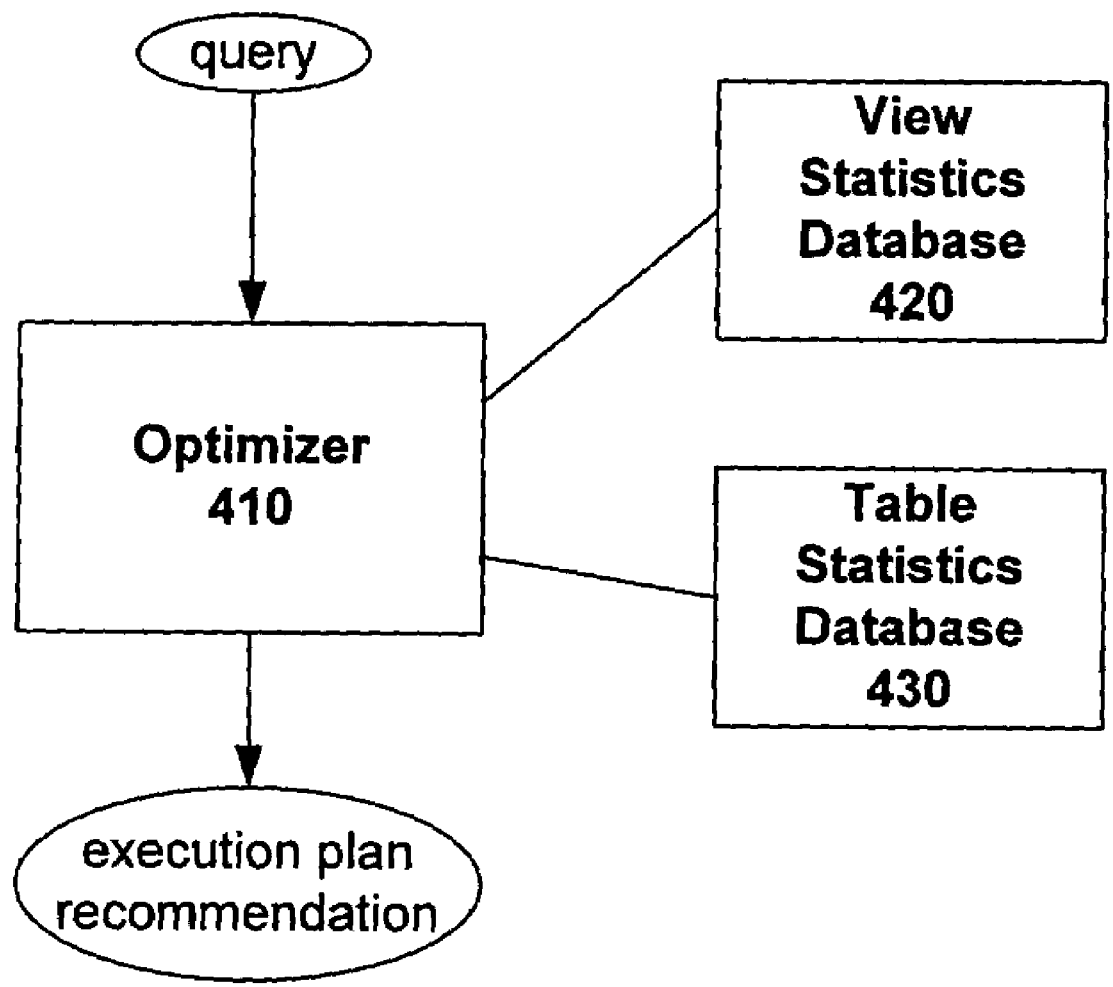
FIG. 4 is a block diagram of an optimizer in accordance with one embodiment of the present invention.

A block diagram of an exemplary system for estimating cardinalities using statistics on views in accordance with the present invention is shown in FIG. 4. Generally, when a query is submitted for execution, optimizer 410 develops candidate plans for execution of the query. A candidate plan is composed of the steps of data processing for the execution of the query. As described above, the cost for each candidate plan is based on the number of rows of data which must be read and processed to execute the candidate plan.

Statistics on views are available in a view statistics database 420. In one embodiment, in order to collect these statistics, when a view is materialized, statistics on the view is stored in the view statistics database 420. In another embodiment, view statistics are collected upon request. That is, for a given view, a request can be made to create view statistics for the view. The created view statistics will be stored in the view statistics database 420. View statistics may include cardinality of the view and distribution of values in one or more columns of the view, among other statistics. View statistics may be complete or may be an estimation. For example, a user may request that view statistics be collected using a sampling of data from the view. A user may also request that view statistics be collected using all of the data from a view. This user selection of a completeness level, when present, in one embodiment, will determine how view statistics will be collected. Where present, table statistics are stored in table statistics database 430.

Figure 5:
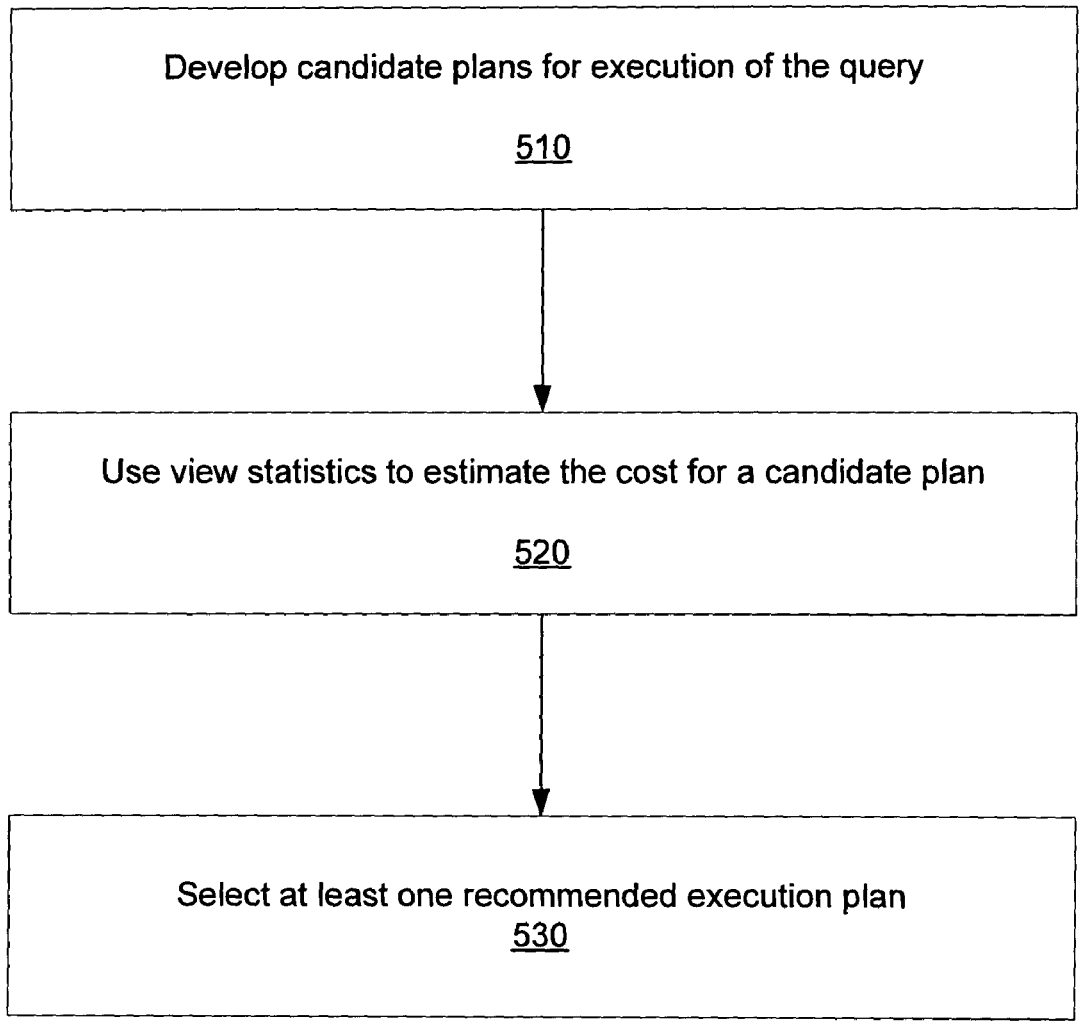
FIG. 5 is a flowchart of an exemplary method for providing query optimization in accordance with one embodiment of the present invention.

A flowchart of an exemplary method for using statistics on views in accordance with the present invention is shown in FIG. 5. Generally, during query optimization, statistics associated with views are consulted. Such statistics in one embodiment include the cardinality of each view. The statistics are preferably stored in view statistics database 420 for use in estimating the cardinality of execution plans.

As shown in FIG. 5, the query optimizer 410 (from FIG. 4) develops candidate plans for execution in step 510. The cost for these candidate plans is evaluated. For at least one of the candidate plans, view statistics are used to estimate the cost for the candidate plan in step 520. At least one candidate plan is then selected as the recommended execution plan in step 530.

In one embodiment, optimizer 410 is based on the Cascades optimizer architecture. In such an optimizer, in step 510 the optimizer uses algebraic transformation rules to implement exploration of the candidate plan search space. Each transformation takes an input operator tree and produces one or more equivalent alternatives.

In one embodiment, the transformation rules match a relational operator tree (all or part of a candidate plan) with a set of candidate views, in order to find one or more views which match or subsume the original expression embodied by the tree. The transformation rules return equivalent expressions based on the views. For example, given the existence of statistics for the CUSTNATION view, the transformation might transform the expression shown in the operator tree of FIG. 2 into the expression shown in the operator tree of FIG. 3. One or more other possible transformations may exist and be produced by the transformation. Because the expressions are equivalent, they produce the same results. Thus, all equivalent expressions should have equivalent cardinality (the number of rows in the result) and other statistics (such as distribution in the result, for example.)

In order to implement cardinality-estimation in the optimizer, in one embodiment, instead of keeping a collection of separate fully-expanded operator trees for each candidate plan, the optimizer 410 uses an encoding which maximizes re-use of common sub-expressions. This encoding is based on a system of groups. Each group contains operators that are the root of equivalent sub-expressions. The inputs for each operator may be placed in other groups according to the same principle, and so the groups recursively form building blocks for more complex operator trees. Each group thus contains equivalent expressions.

Since all expressions in a group produce the same result, cardinality and other statistics for the result can be derived using any one of the operators in the group. The cardinality and other statistics for the group are stored for use in determining cardinality and other statistics for candidate plans. However, the quality of estimation will be higher in some operators, lower in others. In one embodiment, an indication of the quality of the estimation is stored for each group. An estimation resulting from complete view statistics stored in the view statistics database 420 or from table statistics stored in the table statistics database 430 has the maximum reliability. Thus, when a group includes an operator that is a direct reference to a view or table, and when complete statistics are available for that view or table, the cardinality for the group will be the cardinality of that reference.

When no such reference exists, the estimation quality of the cardinality and other statistics for the group will be lower. Additionally, as discussed above, view statistics may be incomplete or based on sampled data, possibly resulting in a view that has a very high reliability but does not contain all columns from the query, the reliability will be high, but not as high as the case of a view which contains all columns from the query. Such partial view statistics may be caused by an explicit create statistics for a view which requests only partial statistics. This allows a savings in of computation time. In one embodiment, the accuracy of the estimate is carried with the estimate. Thus, when an estimate has been obtained for a given operator tree with a first estimate accuracy, and then a second equivalent operator tree yields a second, more accurate estimate, the second estimate can be used for all equivalent operator trees rather than the less accurate estimate.

Because cardinality estimation and view matching are integrated into the general plan generation framework for the optimizer 410, a view can be leveraged despite the fact that it does not match the original input expression. After applying one or more transformation rules, the view matching may establish the link between an alternative of the input expression and one or more views for which statistics are available. Additionally, statistics on views may be used to provide statistics information on a plan even if the candidate plan being evaluated does not contain the view. When a view has been used to provide statistics information for a given candidate plan, the optimizer may choose a different candidate plan which does not contain an expression equivalent to the view as a result of considering the statistics and other factors.

In one embodiment, optimizer 210 estimates the cardinality of each candidate plan based on statistics and selects the candidate plan with the lowest estimated cardinality.

CONCLUSION

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A computer-implemented method for performing query optimization comprising:
    developing at least one candidate plan for execution of a query;
    receiving a user request to collect a view statistic of a view for at least one of said at least one candidate plan, the user request comprising a completeness level, the completeness level indicating a sampling of data from the view, as selected by the user, that is to be used in collecting the view statistic;
    collecting the view statistic responsive to the user request and the completeness level;
    for said at least one of said at least one candidate plan, using the view statistic to estimate the cost of said candidate plan; and
    selecting at least one of said at least one candidate plans as a recommended execution plan,
    wherein said step of using the view statistic to estimate the cost of said candidate plan comprises using at least one transformation rule to transform a first expression comprising all or part of said candidate plan and having an associated first expression estimate quality indicator into an equivalent second expression having an associated second expression estimate quality indicator, where said second expression comprises a reference to one or more views matching the first expression, and wherein said second expression and said first expression have an equivalent cardinality; and
    wherein the step of selecting the recommended execution plan comprises one of the first expression and the second expression having the higher of the first expression estimate quality indicator and the second expression estimate quality indicator.

2. The computer-implemented method of claim 1, where said view statistic comprises a previously stored view statistic.

3. The computer-implemented method of claim 1, where said view statistic comprises a computed view statistic.

4. The computer-implemented method of claim 1, where said view statistic comprises a cardinality for a corresponding view.

5. The computer-implemented method of claim 1, where said view statistic comprises distribution data for values for at least one column in a corresponding view.

6. A computer readable storage medium having a tangible component for performing query optimization having stored thereon computer readable instructions, said instructions comprising instructions for:

developing at least one candidate plan for execution of a query;

receiving a user request to collect a view statistic of a view for at least one of said at least one candidate plan, the user request comprising a completeness level, the completeness level indicating a sampling of data from the view, as selected by the user, that is to be used in collecting the view statistic;

collecting the view statistic responsive to the user request and the completeness level;

for said at least one of said at least one candidate plan, using the view statistic to estimate the cost of said candidate plan; and selecting at least one of said at least one candidate plans as a recommended execution plan, wherein said step of using the view statistic to estimate the cost of said candidate plan comprises using at least one transformation rule to transform a first expression comprising all or part of said candidate plan and having an associated first expression estimate quality indicator into an equivalent second expression having an associated second expression estimate quality indicator, where said second expression comprises a reference to one or more views matching the first expression, and wherein said second expression and said first expression have an equivalent cardinality; and wherein the step of selecting the recommended execution plan comprises one of the first expression and the second expression having the higher of the first expression estimate quality indicator and the second expression estimate quality indicator.

7. The computer storage readable medium of claim 6, where said view statistic comprises a previously stored view statistic.

8. The computer readable storage medium of claim 6, where said view statistic comprises a computed view statistic.

9. The computer readable storage medium of claim 6, where said view statistic comprises a cardinality for a corresponding view.

10. The computer readable storage medium of claim 6, where said view statistic comprises distribution data for values for at least one column in a corresponding view.

11. A system for performing query optimization having stored thereon computer readable instructions, said system comprising:

a processor;

a view statistics storage comprising storage for at least one view statistic, each of said at least one view statistic relating to a corresponding view and collected pursuant to a user request, the user request comprising a completeness level, the completeness level indicating a sampling of data from the view, as selected by the user, that is to be used in collecting the view statistic;

a query optimizer, operably connected to said view statistics storage, for developing at least one candidate plan for a query and using at least one of said at least one view statistic to estimate the cost of said candidate plan, wherein said query optimizer estimates the cost of said candidate plan using at least one transformation rule to transform a first expression comprising all or part of said candidate plan and having an associated first expression estimate quality indicator into an equivalent second expression having an associated second expression estimate quality indicator, where said second expression comprises a reference to one or more views matching the first expression, wherein said second expression and said first expression have an equivalent cardinality, and wherein said query optimizer is further adapted to select a recommended execution plan comprising one of the first expression and the second expression having the higher of the first expression estimate quality indicator and the second expression estimate quality indicator.

12. The system of claim 11, where at least one of said at least one view statistic comprises a cardinality for a corresponding view.

13. The system of claim 11, where at least one of said at least one view statistic comprises distribution data for values for at least one column in a corresponding view.

14. A computer-implemented method for implementing a database comprising:

allowing a user to request a view of data from said database, and a completeness level, the completeness level indicating a sampling of data from the view, as selected by the user, that is to be used in collecting the view statistic;

collecting a view statistic regarding said view responsive to the request and the completeness level;

developing at least one candidate plan for execution of a query;

for at least one of said at least one candidate plan, using said view statistic to estimate the cost of said candidate plan; and selecting at least one of said at least one candidate plans as a recommended execution plan, wherein said step of using the view statistic to estimate the cost of said candidate plan comprises using at least one transformation rule to transform a first expression comprising all or part of said candidate plan and having an associated first expression estimate quality indicator into an equivalent second expression having an associated second expression estimate quality indicator, where said second expression comprises a reference to one or more views matching the first expression, and wherein said second expression and said first expression have an equivalent cardinality; and wherein the step of selecting the recommended execution plan comprises one of the first expression and the second expression having the higher of the first expression estimate quality indicator and the second expression estimate quality indicator.

15. The computer-implemented method of claim 14, where said step of collecting a view statistic regarding said view comprises:

detecting that said view has been materialized.

16. The computer-implemented method of claim 14, where said step of collecting a view statistic regarding said view comprises:

detecting a user request to store said view statistic; and collecting said view statistic.

17. The computer-implemented method of claim 16, where said step of detecting a user request to store said view statistic comprises detecting a completeness level request for said view statistic, and said step of collecting said view statistic collects said view statistic to said requested completeness level.

18. The computer-implemented method of claim 17 where said step of using said view statistic to estimate the cost of said candidate plan comprises using said requested completeness level to determine the accuracy of said cost estimation.

19. A computer readable storage medium having a tangible component for implementing a database having stored thereon computer readable instructions, said instructions comprising instructions for:
   allowing a user to request a view of data from said database, and a completeness level, the completeness level indicating a sampling of data from the view, as selected by the user, that is to be used in collecting the view statistic;
   collecting a view statistic regarding said view responsive to the request and the completeness level;
   developing at least one candidate plan for execution of a query;
   for at least one of said at least one candidate plan, using said view statistic to estimate the cost of said candidate plan;
   identifying an accuracy reading for the estimate, said accuracy reading reflecting the amount of data from which the view statistic was derived; and
   selecting based upon the estimate of the cost and the accuracy reading at least one of said at least one candidate plans as a recommended execution plan,
   wherein said step of using the view statistic to estimate the cost of said candidate plan comprises using at least one transformation rule to transform a first expression comprising all or part of said candidate plan and having an associated first expression estimate quality indicator into an equivalent second expression having an associated second expression estimate quality indicator, where said second expression comprises a reference to one or more views matching the first expression, and wherein said second expression and said first expression have an equivalent cardinality; and
   wherein the step of selecting the recommended execution plan comprises one of the first expression and the second expression having the higher of the first expression estimate quality indicator and the second expression estimate quality indicator.

20. The computer readable storage medium of claim 19, where said collecting a view statistic regarding said view comprises:
   detecting that said view has been materialized.

21. The computer readable storage medium of claim 19, where said collecting a view statistic regarding said view comprises:
   detecting a user request to store said view statistic; and
   collecting said view statistic.

22. The computer readable storage medium of claim 21, where said detecting a user request to store said view statistic comprises detecting a completeness level request for said view statistic, and said step of collecting said view statistic collects said view statistic to said requested completeness level.

23. The computer readable storage medium of claim 22 where said using said view statistic to estimate the cost of said candidate plan comprises using said requested completeness level to determine the accuracy of said cost estimation.

24. A system for implementing a database comprising:
   a processor:
   a user request module for a user to request a view of data from said database, and a completeness level, the completeness level indicating a sampling of data from the view, as selected by the user, that is to be used in collecting the view statistic;
   a view statistic storage for collecting a view statistic regarding said view responsive to the request and the completeness level;
   a candidate plan developer for developing at least one candidate plan for execution of a query;
   an estimator, for at least one of said at least one candidate plan, using said view statistic to estimate the cost of said candidate plan; and
   a candidate plan selector for selecting at least one of said at least one candidate plans as a recommended execution plan,
   wherein said estimator estimates the cost of said candidate plan using at least one transformation rule to transform a first expression comprising all or part of said candidate plan and having an associated first expression estimate quality indicator into an equivalent second expression having an associated second expression estimate quality indicator, where said second expression comprises a reference to one or more views matching the first expression, and wherein said second expression and said first expression have an equivalent cardinality; and
   wherein said candidate plan selector selects the recommended execution plan having one of the first expression and the second expression having the higher of the first expression estimate quality indicator and the second expression estimate quality indicator.

* * * * *

UNITED STATES PATENT AND TRADEMARK OFFICE
CERTIFICATE OF CORRECTION

| | | |
|---|---|---|
| PATENT NO. | : 7,509,311 B2 | Page 1 of 1 |
| APPLICATION NO. | : 10/652423 | |
| DATED | : March 24, 2009 | |
| INVENTOR(S) | : Cesar A. Galindo-Legaria et al. | |

It is certified that error appears in the above-identified patent and that said Letters Patent is hereby corrected as shown below:

In column 11, line 39, in Claim 7, delete "storage readable" and insert -- readable storage --, therefor.

In column 14, line 14, in Claim 24, delete "processor:" and insert -- processor; --, therefor.

Signed and Sealed this
Third Day of May, 2011

David J. Kappos
*Director of the United States Patent and Trademark Office*